US011993271B2

(12) United States Patent
Nakashima et al.

(10) Patent No.: US 11,993,271 B2
(45) Date of Patent: May 28, 2024

(54) INFORMATION PROCESSING APPARATUS, NON-TRANSITORY STORAGE MEDIUM, AND INFORMATION PROCESSING METHOD

(71) Applicant: TOYOTA JIDOSHA KABUSHIKI KAISHA, Toyota (JP)

(72) Inventors: Toyokazu Nakashima, Kasugai (JP); Ryuichi Kamaga, Nagoya (JP); Mitsuhiro Miura, Okazaki (JP); Yasuhiro Baba, Kamo-gun (JP); Tomokazu Maya, Nagoya (JP); Ryosuke Kobayashi, Nagakute (JP); Genshi Kuno, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 7 days.

(21) Appl. No.: 17/658,452

(22) Filed: Apr. 8, 2022

(65) Prior Publication Data

US 2022/0332326 A1 Oct. 20, 2022

(30) Foreign Application Priority Data

Apr. 14, 2021 (JP) ................................. 2021-068548

(51) Int. Cl.
*B60W 40/09* (2012.01)
*G06V 20/59* (2022.01)

(52) U.S. Cl.
CPC ........... *B60W 40/09* (2013.01); *G06V 20/597* (2022.01); *B60W 2420/403* (2013.01); *B60W 2540/21* (2020.02); *B60W 2540/22* (2013.01)

(58) Field of Classification Search
CPC ...................................................... B60W 50/09
See application file for complete search history.

(56) References Cited

U.S. PATENT DOCUMENTS

| 10,706,270 B2 * | 7/2020 | Goto ..................... G06V 40/174 |
| 11,073,836 B2 * | 7/2021 | Tiwari ................. G05D 1/0246 |
| 2019/0141282 A1 | 5/2019 | Jin et al. |
| 2019/0294867 A1 | 9/2019 | Goto et al. |

FOREIGN PATENT DOCUMENTS

| CN | 108171176 B | * 12/2017 | ............... G06K 9/00 |
| JP | 2019-086372 A | 6/2019 | |
| JP | 2020-13438 A | 1/2020 | |
| JP | 2020-52948 A | 4/2020 | |
| JP | 2020-127175 A | 8/2020 | |

* cited by examiner

*Primary Examiner* — Aryan E Weisenfeld
(74) *Attorney, Agent, or Firm* — Oblon, McClelland, Maier & Neustadt, L.L.P.

(57) ABSTRACT

An information processing apparatus communicable with a vehicle includes a controller. The controller is configured to store behavior information of a user in the vehicle in association with a date and time, acquire an image via an imaging unit of the vehicle when a difference between behavior information at a specific time and behavior information at a time later than the specific time is detected, an store the image in association with the date and time and the behavior information.

14 Claims, 6 Drawing Sheets

FIG. 4

| DATE AND TIME | DESTINATION (EXCLUDING HOME) | MOVING ROUTE | IMAGE OR VOICE |
|---|---|---|---|
| ⋮ | ⋮ | ⋮ | ⋮ |
| 9:00 ON MARCH 1, 2020 | WORKPLACE B | B01 | D01 |
| 17:00 ON MARCH 1, 2020 | SCHOOL A | A01 | D02 |
| 9:00 ON MARCH 2, 2020 | WORKPLACE B | B01 | D03 |
| 17:00 ON MARCH 2, 2020 | SCHOOL A | A02 | D04 |
| ⋮ | ⋮ | ⋮ | ⋮ |
| 9:00 ON APRIL 1, 2020 | WORKPLACE B | B02 | D05 |
| 18:00 ON APRIL 1, 2020 | SUPERMARKET C | C01 | D06 |
| 9:00 ON APRIL 2, 2020 | WORKPLACE B | B02 | D07 |
| 18:00 ON APRIL 2, 2020 | SUPERMARKET C | C01 | D08 |

FIG. 5

| DATE AND TIME | MOTION | IMAGE OR VOICE |
|---|---|---|
| 9:00 ON MARCH 2, 2020 | MOTION OF TUT-TUTTING | D09 |
| 18:00 ON MARCH 2, 2020 | MOTION OF YAWNING | D10 |

INFORMATION PROCESSING APPARATUS, NON-TRANSITORY STORAGE MEDIUM, AND INFORMATION PROCESSING METHOD

CROSS-REFERENCE TO RELATED APPLICATION

This application claims priority to Japanese Patent Application No. 2021-068548 filed on Apr. 14, 2021, incorporated herein by reference in its entirety.

BACKGROUND

1. Technical Field

The disclosure relates to an information processing apparatus, a non-transitory storage medium, and an information processing method.

2. Description of Related Art

In the related art, there is known a technique, in which an image is captured by an in-vehicle camera when a vehicle passes through a position designated by a user and the captured image is stored as a memory (for example, Japanese Unexamined Patent Application Publication No. 2019-086372 (JP 2019-086372 A)).

SUMMARY

In the above-described technique, the user needs to designate a position. In a case where the number of captured images is large and no position is designated, it is difficult to extract an image related to a specific memory.

The present disclosure provides an information processing apparatus, a non-transitory storage medium, and an information processing method with which it is possible to automatically store an image.

A first aspect of the present disclosure relates to an information processing apparatus communicable with a vehicle. The information processing apparatus includes a controller. The controller is configured to store behavior information of a user in the vehicle in association with a date and time, acquire an image via an imaging unit of the vehicle when a difference between behavior information at a specific time and behavior information at a time later than the specific time is detected, and store the image in association with the date and time and the behavior information.

In the information processing apparatus according to the first aspect of the present disclosure, the behavior information may include driving information of the vehicle.

In the information processing apparatus according to the first aspect of the present disclosure, the driving information may include at least one of a destination, the frequency of visits to a specific destination, and a moving route to the specific destination.

In the information processing apparatus according to the first aspect of the present disclosure, the behavior information may include motion information of the user.

In the information processing apparatus according to the first aspect of the present disclosure, the motion information may include information about a motion showing the emotion of the user.

In the information processing apparatus according to the first aspect of the present disclosure, the controller may be further configured to acquire a voice of the user via a voice input unit of the vehicle when the difference is detected.

In the information processing apparatus according to the first aspect of the present disclosure, the controller may be further configured to output an image before the difference and an image after the difference to an output unit of the vehicle when the difference is detected.

A vehicle may include the information processing apparatus according to the first aspect of the present disclosure.

A second aspect of the present disclosure relates to a non-transitory storage medium storing instructions that are executable by one or more processors and that cause the one or more processors to perform functions including storing behavior information of a user in a vehicle in association with a date and time, acquiring an image via an imaging unit of the vehicle when a difference between behavior information at a specific time and behavior information at a time later than the specific time is detected, and storing the image in association with the date and time and the behavior information.

In the non-transitory storage medium according to the second aspect of the present disclosure, the behavior information may include driving information of the vehicle.

In the non-transitory storage medium according to the second aspect of the present disclosure, the driving information may include at least one of a destination, the frequency of visits to a specific destination, and a moving route to the specific destination.

In the non-transitory storage medium according to the second aspect of the present disclosure, the behavior information may include motion information of the user.

In the non-transitory storage medium according to the second aspect of the present disclosure, the motion information may include information about a motion showing the emotion of the user.

In the non-transitory storage medium according to the second aspect of the present disclosure, the functions may further include acquiring a voice of the user via a voice input unit of the vehicle when the difference is detected.

A third aspect of the present disclosure relates to an information processing method executed by an information processing apparatus communicable with a vehicle. The information processing method includes storing behavior information of a user in the vehicle in association with a date and time, acquiring an image via an imaging unit of the vehicle when a difference between behavior information at a specific time and behavior information at a time later than the specific time is detected, and storing the image in association with the date and time and the behavior information.

In the information processing method according to the third aspect, the behavior information may include driving information of the vehicle.

In the information processing method according to the third aspect, the driving information may include at least one of a destination, the frequency of visits to a specific destination, and a moving route to the specific destination.

In the information processing method according to the third aspect, the behavior information may include motion information of the user.

In the information processing method according to the third aspect, the motion information may include information about a motion showing the emotion of the user.

The information processing method according to the third aspect may further include acquiring a voice of the user via a voice input unit of the vehicle when the difference is detected.

With the information processing apparatus, the non-transitory storage medium, and the information processing method according to the aspects of the present disclosure, it is possible to automatically store an image.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a table showing a data structure of a destination database (DB);

FIG. 5 is a table showing a data structure of a motion DB;

DETAILED DESCRIPTION OF EMBODIMENTS

Figure 1:
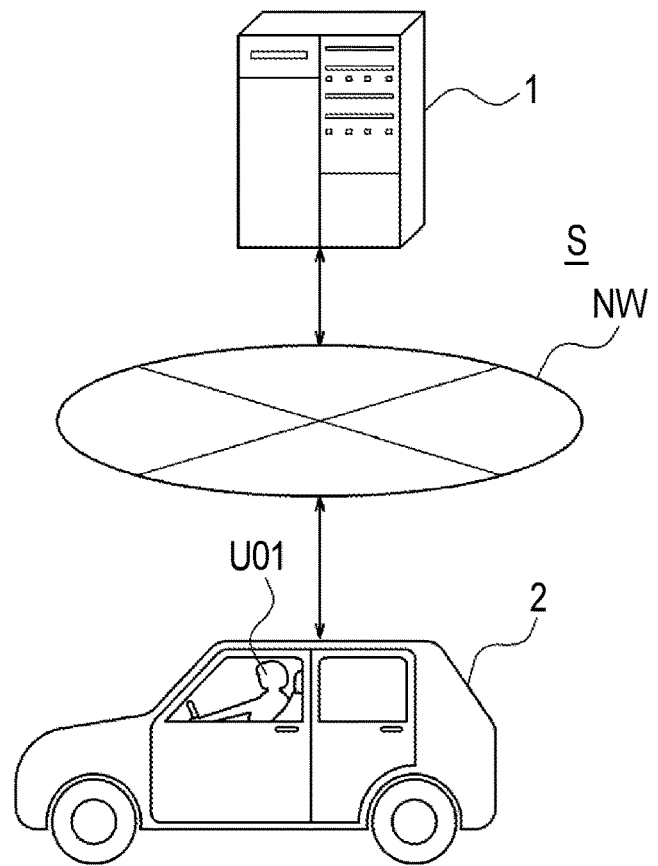
FIG. 1 is a schematic diagram of an information processing system.

FIG. 1 is a schematic diagram of an information processing system S of the present embodiment. The information processing system S includes an information processing apparatus 1 and a vehicle 2 that can communicate with each other via a network NW. Examples of the network NW include a mobile communication network and the Internet.

In FIG. 1, for the sake of simplicity of description, one information processing apparatus 1 and one vehicle 2 are shown. However, the number of information processing apparatuses 1 and the number of vehicles 2 are not limited thereto. For example, processing that is executed by the information processing apparatus 1 in the present embodiment may be executed by a plurality of information processing apparatuses 1 disposed in a dispersive manner. A plurality of vehicles 2 may be operated by a user U01.

The outline of the processing executed by the information processing apparatus 1 of the present embodiment will be described. A controller 11 of the information processing apparatus 1 stores behavior information of the user U01 in the vehicle 2 in association with a date and time and acquires an image via an imaging unit of the vehicle 2 when a difference between behavior information at a specific time and behavior information at a time later than the specific time is detected. The controller 11 stores the image in association with the date and time and the behavior information. With such a configuration, the information processing apparatus 1 can automatically store an image when there is a change in user's behavior. Therefore, with the information processing apparatus 1, the user U01 can extract an image associated with a specific memory later.

The information processing apparatus 1 is installed in a facility such as a data center. The information processing apparatus 1 is a computer such as a server belonging to a cloud computing system or another computing system. As an alternative example, the information processing apparatus 1 may be mounted in the vehicle 2.

Figure 2:
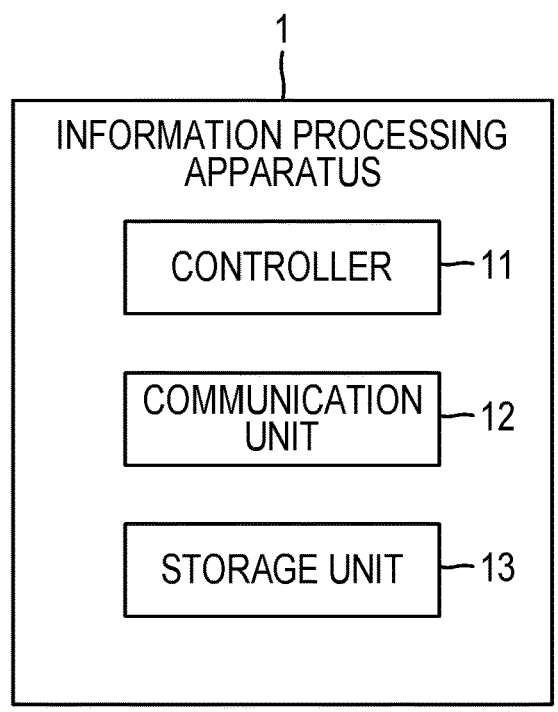
FIG. 2 is a block diagram showing a configuration of an information processing apparatus.

With reference to FIG. 2, the internal configuration of the information processing apparatus 1 will be described in detail.

The information processing apparatus 1 includes the controller 11, a communication unit 12, and a storage unit 13. Components of the information processing apparatus 1 are connected to each other such that the components can communicate with each other via, for example, a dedicated line.

The controller 11 includes, for example, one or more general-purpose processors including a central processing unit (CPU) or a micro processing unit (MPU). The controller 11 may include one or more dedicated processors specialized for specific processing. The controller 11 may include one or more dedicated circuits instead of including the processor. The dedicated circuit may be, for example, a field-programmable gate array (FPGA) or an application specific integrated circuit (ASIC). The controller 11 may include an electronic control unit (ECU). The controller 11 transmits and receives any information via the communication unit 12.

The communication unit 12 includes a communication module conforming to one or more wired or wireless local area network (LAN) standards for connection to the network NW. The communication unit 12 may include a module conforming to one or more mobile communication standards including Long Term Evolution (LTE), the 4th Generation (4G), and the 5th Generation (5G). The communication unit 12 may include a communication module or the like conforming to one or more short-distance communication standards or specifications including Bluetooth (a registered trademark), AirDrop (a registered trademark), IrDA, ZigBee (a registered trademark), FeliCa (a registered trademark), and RFID. The communication unit 12 transmits and receives any information via the network NW.

The storage unit 13 includes, for example, a semiconductor memory, a magnetic memory, an optical memory, or a combination of at least two of a semiconductor memory, a magnetic memory, and an optical memory. However, the present disclosure is not limited thereto. The semiconductor memory is, for example, a RAM or a ROM. The RAM is, for example, an SRAM or a DRAM. The ROM is, for example, an EEPROM. The storage unit 13 may function as a main storage device, an auxiliary storage device, or a cache memory, for example. The storage unit 13 may store information about the result of analysis or processing executed by the controller 11. The storage unit 13 may store various items of information and the like related to the operation or control of the information processing apparatus 1. The storage unit 13 may store a system program, an application program, embedded software, and the like. The storage unit 13 includes a destination DB and a motion DB which will be described later.

Examples of the vehicle 2 include any type of motor vehicle such as a micromobility device, a gasoline vehicle, a diesel vehicle, an HEV, a PHEV, a BEV, and an FCEV. Components of the vehicle 2 are connected to each other such that the components can communicate with each other via, a vehicle-mounted network such as a controller area network (CAN) or a dedicated line. The "HEV" is an abbreviation of "hybrid electric vehicle". The "PHEV" is an abbreviation of "plug-in hybrid electric vehicle". The "BEV" is an abbreviation of "battery electric vehicle". The "FCEV" is an abbreviation of "fuel cell electric vehicle". The vehicle 2 of the present embodiment is driven by a driver. As an alternative example, the driving of the vehicle 2 may be automated at any level. The level of automation is, for example, any of level 1 to level 5 in the level classification of the SAE. The "SAE" is an abbreviation of "society of automotive engineers". The vehicle 2 may be a vehicle dedicated to Maas. The "MaaS" is an abbreviation of "mobility-as-a-service". The vehicle 2 may be, for example, a bicycle, a motorized bicycle, or a motorcycle.

Figure 3:
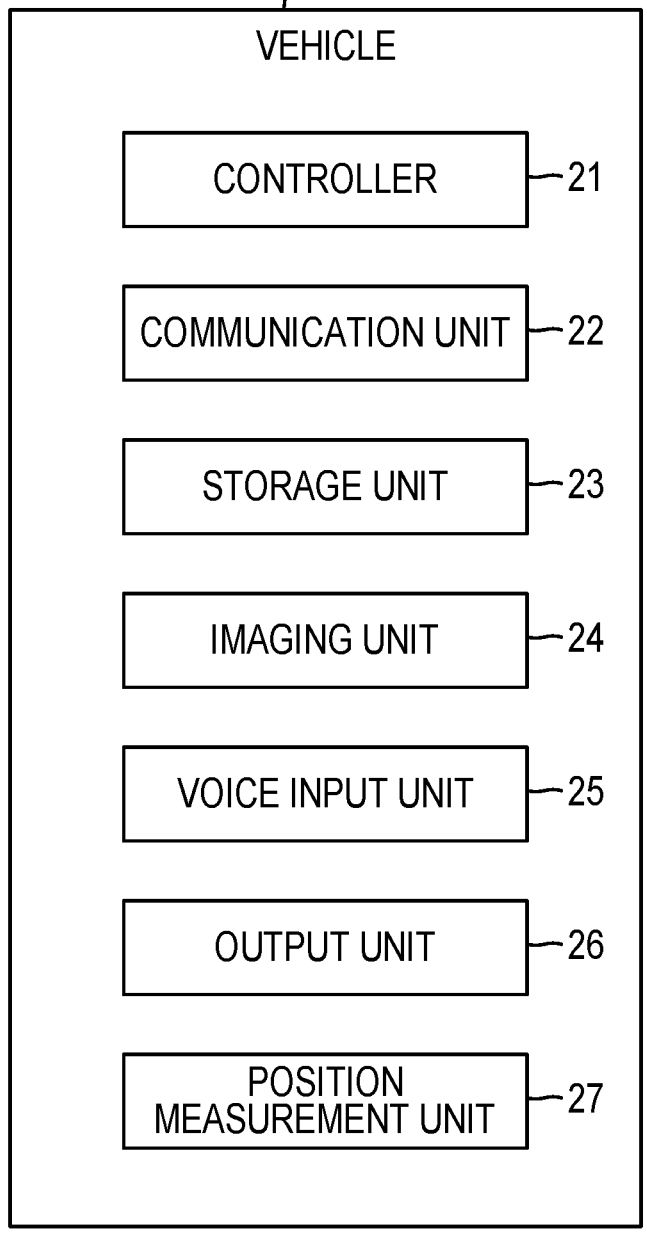
FIG. 3 is a block diagram showing a configuration of a vehicle.

With reference to FIG. 3, the internal configuration of the vehicle 2 will be described in detail.

The vehicle 2 includes a controller 21, a communication unit 22, a storage unit 23, an imaging unit 24, a voice input unit 25, an output unit 26, and a position measurement unit 27. Components of the vehicle 2 are connected to each other such that the components can communicate with each other via, for example, a dedicated line.

The hardware configurations of the controller 21, the communication unit 22, and the storage unit 23 of the vehicle 2 may be the same as the hardware configurations of the controller 11, the communication unit 12, and the storage unit 13 of the information processing apparatus 1. Here, descriptions thereof will be omitted.

The imaging unit 24 includes a camera. The imaging unit 24 can image the vicinity of the imaging unit 24. The imaging unit 24 may record a captured image in the storage unit 23 or transmit the captured image to the controller 21 for image analysis. Examples of the Image include a still image and a moving image.

The voice input unit 25 includes a microphone that receives a voice input. The voice input unit 25 collects sounds inside or outside the vehicle 2. An electronic device having a microphone function, such as a smartphone used by a driver of the vehicle 2, may function as the voice input unit 25. The voice input unit 25 may be connected to the vehicle 2 as an external output device instead of being provided in the vehicle 2. As a connection method, for example, any method such as USB, HDMI (registered trademark), or Bluetooth (registered trademark) can be used. The "USB" is an abbreviation of "universal serial bus". The "HDMI (registered trademark)" is an abbreviation of "high-definition multimedia interface".

The output unit 26 includes at least one output interface. The output interface is, for example, a display or a speaker. The display is, for example, an LCD or an organic EL display. The "LCD" is an abbreviation of "liquid crystal display". The "EL" is an abbreviation of "electroluminescence". The output unit 26 outputs an image or a voice obtained through the operation of the vehicle 2. The image or voice may be output for a predetermined period of time. The output unit 26 may be connected to the vehicle 2 as an external output device instead of being provided in the vehicle 2. As a connection method, for example, any method such as USB, HDMI (registered trademark), or Bluetooth (registered trademark) can be used.

The position measurement unit 27 includes at least one GNSS receiver. The "GNSS" is an abbreviation of "global navigation satellite system". The GNSS includes, for example, at least any one of GPS, QZSS, BeiDou, GLONASS, and Galileo. The "GPS" is an abbreviation of "Global Positioning System". The "QZSS" is an abbreviation of "quasi-zenith satellite system". A QZSS satellite is called a "quasi-zenith satellite". The "GLONASS" is an abbreviation of "global navigation satellite system". The position measurement unit 27 measures the position of the vehicle 2. The result of the measurement is acquired by the controller 21 as position information of the vehicle 2. The "position information" is information with which it is possible to specify the position of the vehicle 2. The position information includes, for example, an address, a latitude, a longitude, or an altitude.

Hereinafter, processing executed by the information processing system S of the present embodiment will be described in detail.

Storing Processing Related to Destination

The vehicle 2 is driven by the user U01 and visits one or more destinations. The vehicle 2 determines a destination by using the result of position measurement performed by the position measurement unit 27. As shown in FIG. 4, the information processing apparatus 1 stores, in the destination DB of the storage unit 13, information about a destination in association with information about a date and time at which the vehicle 2 has visited the destination. The information about the destination is an example of driving information included in behavior information of the user U01. As shown in FIG. 4, the contents of a visit made by the user U01 on Mar. 1, 2020 are as follows.

9:00: the user U01 has visited a workplace B from home through a moving route B01

17:00: the user U01 has visited a school A from the workplace B through a moving route A01

The reason for visiting the school A here is to pick up a child returning to home from the school.

Here, a case where the user U01 repeats visits, of which the contents are the same as the contents of the above-mentioned visit on Mar. 1, 2020, from March 2 (which is the day after March 1) to March 31 will be described.

The controller 21 of the vehicle 2 determines a moving route to each destination by using the result of position measurement. The controller 21 transmits information about the moving route to the information processing apparatus 1. The information about the moving route is an example of driving information included in behavior information. As shown in FIG. 4, the information processing apparatus 1 stores the information about the moving route in the destination DB in association with a date and time.

The controller 21 can image the vicinity of the vehicle 2 or image the user U01 by means of the imaging unit 24 during movement of the vehicle 2 to each destination.

The vicinity of the vehicle 2 or the user U01 may be imaged during movement of the vehicle 2 each time the vehicle 2 moves to a destination. Each of images D01 to D04 shown in FIG. 4 is captured and stored during movement of the vehicle 2 when the vehicle 2 moves to a destination. However, the vicinity of the vehicle 2 or the user U01 does not need to be imaged during movement of the vehicle 2 each time the vehicle 2 moves to a destination. That is, the images D01 to D04 do not need to be captured. In a case where the images D01 to D04 are captured, the images D01 to D04 can be used as images before detection of a difference, which will be described later.

In a case where an image is a still image, at least one image is captured during movement of the vehicle 2. In a case where an image is a moving image, the image may be captured throughout the movement and may be captured over at least a part of the movement. The vicinity of the vehicle 2 includes, for example, a space in front of the vehicle 2 and the vicinity of the vehicle 2 may also include a space beside the vehicle 2 and a space behind the vehicle 2. The controller 21 transmits a captured image to the information processing apparatus 1. As shown in FIG. 4, the information processing apparatus 1 stores, the image in the destination DB of the storage unit 13 in association with a date and time.

The controller 21 can acquire a voice inside or outside the vehicle 2 by means of the voice input unit 25 during movement to each destination. As with the capturing of images, a voice may be acquired during movement of the vehicle 2 each time the vehicle 2 moves to a destination. Each of voices D01 to D04 shown in FIG. 4 is acquired during movement of the vehicle 2 when the vehicle 2 moves to a destination. Acquisition of the voices D01 to D04 is optional. The controller 21 transmits data of an acquired voice to the information processing apparatus 1. As shown in FIG. 4, the information processing apparatus 1 stores the voice in the storage unit 13.

Detection Processing Related to Destination

As shown in FIG. 4, since Apr. 1, 2020, the user U01 does not visit the school A. That is, destinations at a specific time (here, March 2020) and destinations at a time later than the specific time (here, April 2020) are different from each other. In this case, the controller 11 detects a difference in behavior information. The timing of detection of the difference is, for example, as follows.

A time when the user U01 sets a destination that is a new destination for the user U01 to visit at the time later than the specific time as a destination of a car navigation system or the like in order to visit the destination (example: a time when the user U01 sets a supermarket C as a destination of the car navigation system in order to move from the workplace B to the supermarket C on Apr. 1, 2020).

A time when a determination is made from position information of the vehicle 2 that a new moving route is different from a moving route for the specific time while the user U01 is visiting a destination that is a new destination for the user U01 to visit at the time later than the specific time, the user U01 is staying at the destination, or the user U01 is returning from the destination (example: a time when a determination is made from position information at the time of stoppage or the like of the vehicle 2 that a current moving route is different from a moving route for March 2020 while the user U01 is moving from the workplace B to the supermarket C on Apr. 1, 2020).

The specific time may be a specific time point or a specific period of time.

When the controller 11 detects the difference, the controller 11 acquires an image via the imaging unit 24. Specifically, for example, when the controller 11 detects a difference in behavior information at the above-described timing, the controller 11 requests the imaging unit 24 of the vehicle 2 to capture an image. The controller 11 acquires an image or voice D06 via the imaging unit 24 of the vehicle 2, for example, while the vehicle 2 is moving to the supermarket C. The controller 11 stores the image or voice D06 in the destination DB. Similarly, when the controller 11 detects a difference on Apr. 2, 2020 as well, the controller 11 acquires an image or voice D08.

Here, the controller 11 acquires an image or a voice during movement of the vehicle 2 each time the vehicle 2 moves to a destination. Specifically, the controller 11 acquires images or voices D05, D07. Acquisition of the images or voices D05, D07 is optional.

In the above-described example, an image or voice is acquired during movement to a destination (here, the supermarket C) that is a new destination to visit at a time later than a specific time. As an alternative example, the image or voice acquired may be an image or voice related to behavior information at the time later than the specific time and may be an image or voice related to the destination that is the new destination to visit at the time later than the specific time. For example, the image or voice may be acquired while a user is staying at the new destination and may be acquired while the user is returning from the new destination.

Figure 6:
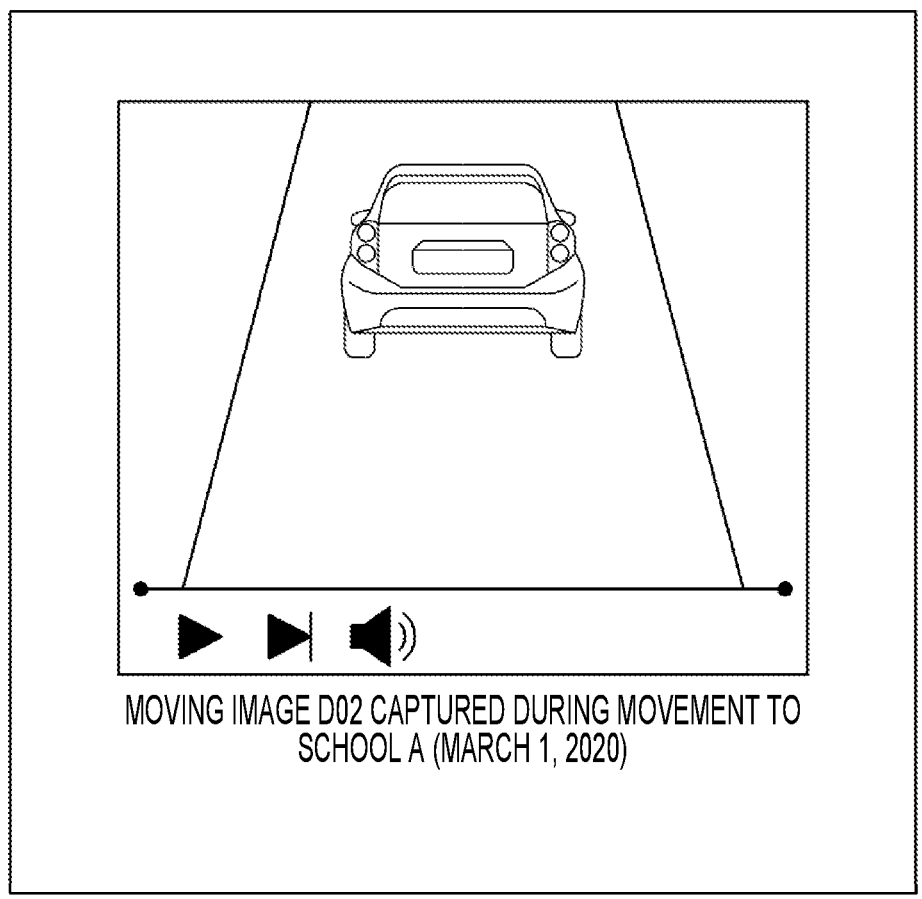
FIG. 6 is a diagram showing an example of a moving image.

When the controller 21 of the vehicle 2 receives an output request from the user U01, the controller 21 acquires, from the destination DB, an image or voice requested by the user U01 and outputs the image or voice to the output unit 26. Here, a case where the image or voice D02 stored when the user U01 visits the school A is requested will be described. As shown in FIG. 6, the controller 21 outputs the image or voice D02 to the output unit 26.

As an alternative example, the controller 11 may detect a difference in behavior information when the frequency of visits to a specific destination at a specific time is increased or decreased at a time later than the specific time. The frequency of visits is an example of driving information. For example, the controller 11 detects a difference in behavior information when the frequency of visits to a specific destination is decreased from once a day to once a week. When the controller 11 detects a difference in behavior information, the controller 11 acquires an image via the imaging unit 24 of the vehicle 2. The controller 11 may further acquire a voice of the user U01 via the voice input unit 25 of the vehicle 2. The controller 11 may acquire at least one of an image or voice before an increase or decrease in frequency and an image or voice after the increase or decrease in frequency from the destination DB and output the image or voice to the output unit 26. The image or voice before the increase or decrease in frequency and the image or voice after the increase or decrease in frequency may be output through the same screen of the output unit 26.

As shown in FIG. 4, since Apr. 1, 2020, the moving route to the workplace B is changed from the moving route B01 to a moving route B02. That is, moving routes at a specific time (here, March 2020) and moving routes at a time later than the specific time (here, April 2020) are different from each other. In this case, the controller 11 detects a difference in behavior information. When the controller 11 detects a difference in behavior information, the controller 11 requests the imaging unit 24 of the vehicle 2 to capture an image. The controller 11 acquires the image D05 via the imaging unit 24 of the vehicle 2. The controller 11 stores the image D05 in the destination DB. The controller 11 may further acquire the voice D05 of the user U01 via the voice input unit 25 of the vehicle 2. The controller 11 stores the voice D05 in the destination DB.

Figure 7:
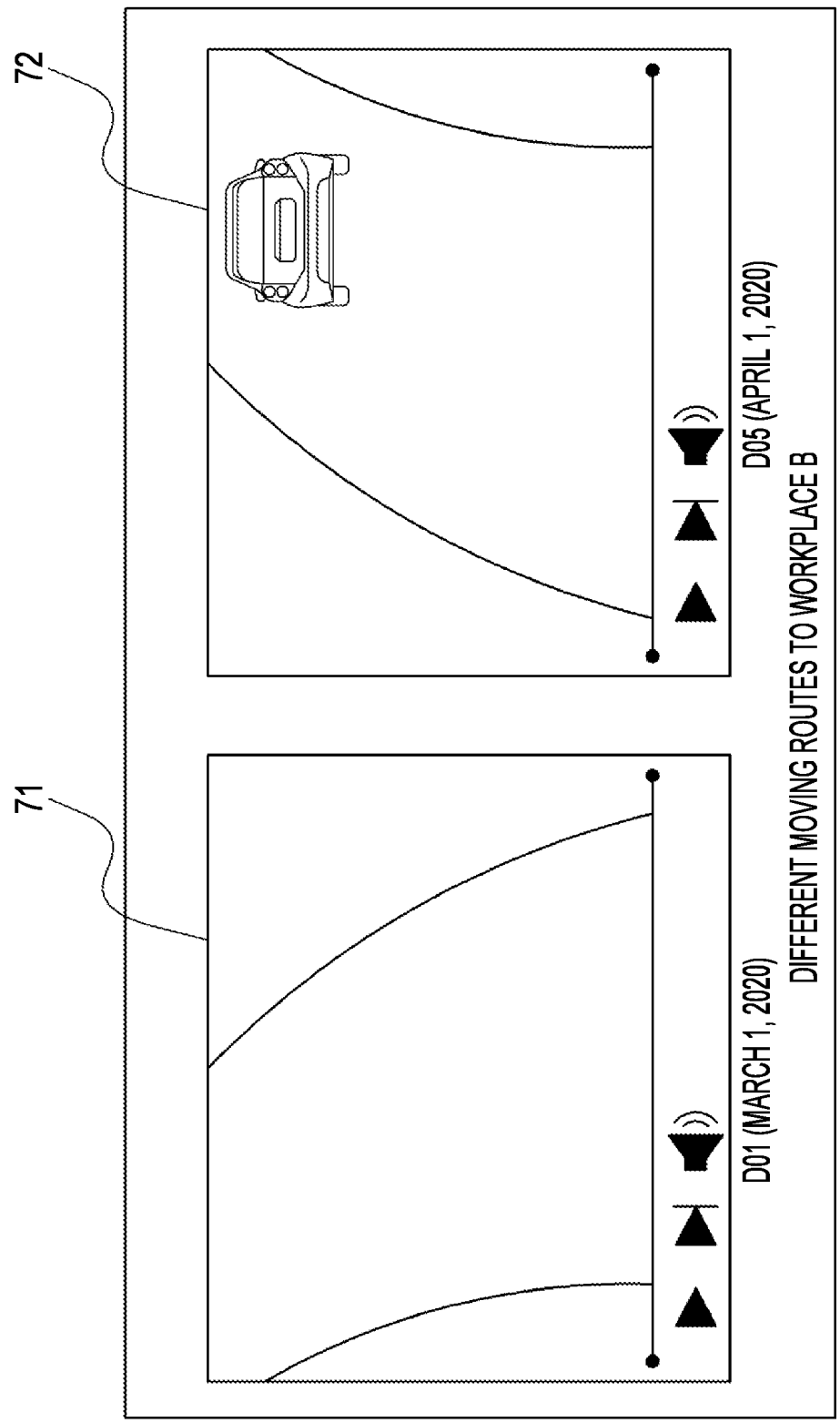
FIG. 7 is a diagram showing another example of the moving image.

When the controller 21 of the vehicle 2 receives an output request from the user U01, the controller 21 acquires, from the destination DB, an image or voice requested by the user U01 and outputs the image or voice to the output unit 26. For example, as shown in FIG. 7, the controller 21 can cause the image or voice D01 (corresponding to a screen 71) before a change in moving route and the image or voice D05 (corresponding to a screen 72) after the change in moving route to be output through the same screen.

Storing Processing Related to Motion

The controller 21 causes the imaging unit 24 to image the user U01 periodically or non-periodically. The controller 21 transmits a captured image to the information processing apparatus 1. The controller 21 causes the voice input unit 25 to periodically or non-periodically acquire a voice of the user U01 inside the vehicle 2. The controller 21 transmits data of the acquired voice to the information processing apparatus 1.

The controller 11 of the information processing apparatus 1 stores an image and a voice of the user U01 in the storage unit 13. The controller 11 analyzes the image and the voice of the user U01 to detect a motion showing the emotion of the user U01. Information of the motion showing the emotion is an example of motion information of the user U01 which is included in behavior information. Examples of the motion include a motion of tut-tutting, a motion of frowning, a motion of yawning, a motion of smiling, a motion of sighing, and a motion of widely opening eyes. A motion of tut-tutting and a motion of frowning show displeasure or dissatisfaction. A motion of yawning shows drowsiness. A motion of smiling shows pleasure. A motion of sighing shows anxiety or dissatisfaction. A motion of widely opening eyes shows surprise or curiosity.

The controller 21 can image the vicinity of the vehicle 2 or image the user U01 by means of the imaging unit 24. The vicinity of the vehicle 2 or the user U01 may be imaged when the above-described difference is detected and may be imaged periodically. The controller 21 transmits a captured image to the information processing apparatus 1. As shown in FIG. 5, the information processing apparatus 1 stores the image in the storage unit 13.

The controller 21 can acquire a voice inside or outside the vehicle 2 by means of the voice input unit 25. A voice may be acquired when the above-described difference is detected and may be acquired periodically. The controller 21 transmits data of the acquired voice to the information processing apparatus 1. As shown in FIG. 5, the information processing apparatus 1 stores the voice in the storage unit 13.

Detecting Processing Related to Motion

As shown in FIG. 5, at 9:00 on Mar. 2, 2020, a motion of tut-tutting, which shows displeasure, is detected. At 18:00 on the same day, a motion of yawning, which shows drowsiness, is detected. That is, an emotion at a specific time (here, 9:00 on Mar. 2, 2020) and an emotion at a time later than the specific time (here, 18:00 on March 2) are different from each other. In this case, the controller 11 detects a difference in behavior information.

When the controller 11 detects a difference in behavior information, the controller 11 requests the imaging unit 24 of the vehicle 2 to capture an image of the vicinity of the vehicle 2 or the user U01. The controller 11 acquires the image via the imaging unit 24 of the vehicle 2. Here, an image D10 at the time of detection of the motion of yawning is acquired. The controller 11 stores the image in the motion DB. The controller 11 may further acquire a voice D10 of the user U01 via the voice input unit 25 of the vehicle 2. The controller 11 stores the voice in the motion DB.

When the controller 21 of the vehicle 2 receives an output request from the user U01, the controller 21 acquires, from the motion DB, an image or voice requested by the user U01 and outputs the image or voice to the output unit 26. Here, the image or voice D10 at the time of the motion of yawning of the user U01 is requested and output.

Flowchart

Figure 8:
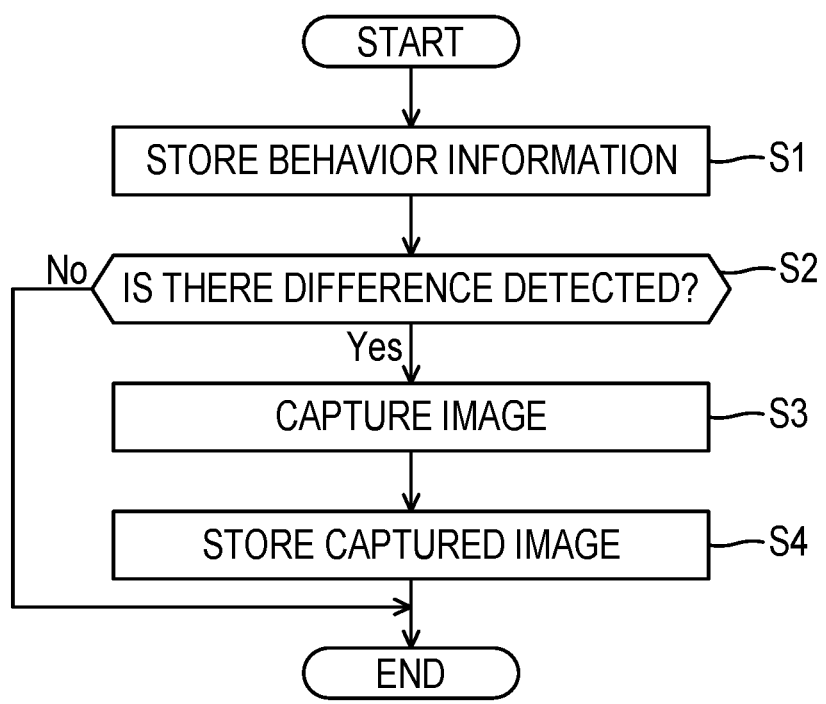
FIG. 8 is a flowchart showing the operation of the information processing apparatus.

An information processing method executed by the information processing apparatus 1 of the present embodiment will be described with reference to FIG. 8. The information processing method may be executed periodically.

In step S1, the controller 11 of the information processing apparatus 1 acquires behavior information from the vehicle 2 via the communication unit 12 and stores the behavior information in the storage unit 13.

In step S2, the controller 11 determines whether or not a difference between behavior information at a specific time and behavior information at a time later than the specific time is detected.

In a case where the result of the determination in step S2 is Yes, the controller 11 causes the imaging unit 24 of the vehicle 2 to capture an image of the vicinity of the vehicle 2 or the user U01 in step S3. In step S4, the controller 11 stores the captured image, which is acquired from the vehicle 2, in the storage unit 13.

In a case where the result of the determination in step S2 is No, the controller 11 terminates the flow without step S3 and step S4.

As described above, according to the present embodiment, the controller 11 of the information processing apparatus 1 stores behavior information of the user U01 in the vehicle 2 in association with a date and time and acquires an image via the imaging unit of the vehicle 2 when a difference between behavior information at a specific time and behavior information at a time later than the specific time is detected. The controller 11 stores the image in association with the date and time and the behavior information. With such a configuration, the information processing apparatus 1 can automatically store an image when there is a change in user's behavior. Therefore, with the information processing apparatus 1, the user U01 can extract an image associated with a specific memory later.

In addition, according to the present embodiment, the behavior information includes driving information of the vehicle 2. The driving information includes at least one of a destination, the frequency of visits to a specific destination, and a moving route to the specific destination. With the information processing apparatus 1 having such a configuration, the user U01 can extract an image associated with a memory during driving later.

In addition, according to the present embodiment, the behavior information includes motion information of the user U01. The motion information includes information about a motion showing the emotion of the user U01. With the information processing apparatus 1 having such a configuration, the user U01 can extract an image related to a memory at the time of an expression of the emotion of the user U01.

In addition, according to the present embodiment, the controller 11 further acquires a voice of the user U01 via the voice input unit 25 of the vehicle 2 when the difference is detected. With the information processing apparatus 1 having such a configuration, the user U01 can extract a voice associated with a specific memory later.

In addition, according to the present embodiment, the controller 11 outputs an image before the difference and an image after the difference to the output unit 26 of the vehicle 2 when the difference is detected. With the information processing apparatus 1 having such a configuration, the user U01 can compare the image before the difference and the image after the difference.

Although the present disclosure has been described with reference to the drawings and examples, it should be noted that those skilled in the art may make various changes and modifications based on the present disclosure. Other modifications without departing from the scope of the disclosure can also be made. For example, the functions or the like included in each means or each step can be rearranged without logical inconsistency, and a plurality of means or steps can be combined with each other or be divided.

For example, in the above-described embodiment, a program for all or part of the functions or processing of the information processing apparatus 1 can be recorded on a computer-readable recording medium. Examples of the computer-readable recording medium include a non-transitory computer-readable medium. For example, the computer-readable recording medium is a magnetic recorder, an optical disc, a magneto-optic recording medium, or a semiconductor memory. Distribution of the program is performed, for example, by selling, handing over, or renting a portable recording medium such as a digital versatile disc (DVD) or a compact disc read-only memory (CD-ROM) on which the program is recorded. In addition, the distribution of the program may be performed by storing the program in a storage of any server and transmitting the program from the server to another computer. The program may also be provided as a program product. The present disclosure can also be realized as a program that can be executed by a processor. Note that, as another embodiment, it is also possible to provide a non-transitory storage medium storing instructions that cause one or more processors to perform all or part of the functions or processing of the information processing apparatus 1.

For example, a computer temporarily stores the program recorded on the portable recording medium or the program transferred from the server in a main storage device. Then, the computer reads the program stored in the main storage device by means of a processor, and executes processing according to the read program by means of the processor. The computer may read the program directly from the portable recording medium and execute the processing according to the program. The computer may sequentially execute the processing according to the received program each time the program is transferred from the server to the computer. The processing may be executed through a so-called ASP type service that realizes a function by means of an execution instruction and acquisition of results without transfer of the program from the server to the computer. The "ASP" is an abbreviation of "application service provider". The program includes information that is provided for processing executed by a computer and is equivalent to the program. For example, data that is not a direct command with respect to a computer but has a property of defining processing of the computer corresponds to "information equivalent to the program".

What is claimed is:

1. An information processing apparatus communicable with a vehicle, the information processing apparatus comprising:
at least one processor programmed to:
store behavior information of a user in the vehicle in association with a date and time,
acquire an image of surroundings of the vehicle via an imaging unit of the vehicle when a difference between behavior information at a specific time and behavior information at a time later than the specific time is detected, and
store the image in association with the date and time and the behavior information, wherein
the behavior information includes driving information of the vehicle,
the driving information includes a destination, a frequency of visits to a specific destination, and a moving route to a specific destination, and
the at least one processor is further configured to:
determine that the difference between the destination at the specific time and the destination at the time later than the specific time is detected, the destination at the specific time being a destination that is arrived at after the vehicle has travelled thereto,
acquire the image of the surroundings of the vehicle when the at least one processor determines that the difference between the destination at the specific time and the destination at the time later than the specific time is detected,
determine that the difference between the destination at the specific time and the destination at the time later than the specific time is not detected, the destination at the specific time being the destination that is arrived at after the vehicle has travelled thereto,
not acquire the image of the surroundings of the vehicle when the at least one processor determines that the difference between the destination at the specific time and the destination at the time later than the specific time is not detected,
determine that the difference between the frequency of visits to the specific destination at the specific time and the frequency of visits to the specific destination at the time later than the specific time is detected, the frequency of visits to the specific destination at the specific time being a frequency at which the vehicle has travelled to the specific destination that is a destination that is arrived at after the vehicle has travelled thereto,
acquire the image of the surroundings of the vehicle when the at least one processor determines that the difference between the frequency of visits to the specific destination at the specific time and the frequency of visits to the specific destination at the time later than the specific time is detected,
determine that the difference between the frequency of visits to the specific destination at the specific time and the frequency of visits to the specific destination at the time later than the specific time is not detected, the frequency of visits to the specific destination at the specific time being a frequency at which the vehicle has travelled to the specific destination that is the destination that is arrived at after the vehicle has travelled thereto,
not acquire the image of the surroundings of the vehicle when the at least one processor determines that the difference between the frequency of visits to the specific destination at the specific time and the frequency of visits to the specific destination at the time later than the specific time is not detected,
determine that the difference between the moving route to the specific destination at the specific time and the moving route to the specific destination at the time later than the specific time is detected, the moving route to the specific destination at the specific time being a moving route to the specific destination that is a destination that is arrived at after the vehicle has travelled thereto,
acquire the image of the surroundings of the vehicle when the at least one processor determines that the difference between the moving route to the specific destination at the specific time and the moving route to the specific destination at the time later than the specific time is detected,
determine that the difference between the moving route to the specific destination at the specific time and the moving route to the specific destination at the time later than the specific time is not detected, the moving route to the specific destination at the specific time being the moving route to the specific destination that is the destination that is arrived at after the vehicle has travelled thereto, and
not acquire the image of the surroundings of the vehicle when the at least one processor determines that the difference between the moving route to the specific destination at the specific time and the moving route to the specific destination at the time later than the specific time is not detected.

2. The information processing apparatus according to claim 1, wherein the behavior information includes motion information of the user.

3. The information processing apparatus according to claim 2, wherein the motion information includes information about a motion showing an emotion of the user.

4. The information processing apparatus according to claim 1, wherein the at least one processor is further programmed to acquire a voice of the user via a voice input unit of the vehicle when the difference is detected.

5. The information processing apparatus according to claim 1, wherein the at least one processor is further programmed to output an image before the difference and an image after the difference to an output unit of the vehicle when the difference is detected.

6. A vehicle comprising the information processing apparatus according to claim 1.

7. A non-transitory storage medium storing instructions that are executable by one or more processors and that cause the one or more processors to perform functions comprising:
storing behavior information of a user in a vehicle in association with a date and time;
acquiring an image of surroundings of the vehicle via an imaging unit of the vehicle when a difference between behavior information at a specific time and behavior information at a time later than the specific time is detected; and
storing the image in association with the date and time and the behavior information, wherein
the behavior information includes driving information of the vehicle,
the driving information includes a destination, a frequency of visits to a specific destination, and a moving route to a specific destination, and
the functions further comprise:
determining that the difference between the destination at the specific time and the destination at the time later than the specific time is detected, the destination at the specific time being a destination that is arrived at after the vehicle has travelled thereto,
acquiring the image of the surroundings of the vehicle when it is determined that the difference between the destination at the specific time and the destination at the time later than the specific time is detected,
determining that the difference between the destination at the specific time and the destination at the time later than the specific time is not detected, the destination at the specific time being the destination that is arrived at after the vehicle has travelled thereto,
not acquiring the image of the surroundings of the vehicle when it is determined that the difference between the destination at the specific time and the destination at the time later than the specific time is not detected,
determining that the difference between the frequency of visits to the specific destination at the specific time and the frequency of visits to the specific destination at the time later than the specific time is detected, the frequency of visits to the specific destination at the specific time being a frequency at which the vehicle has travelled to the specific destination that is a destination that is arrived at after the vehicle has travelled thereto,
acquiring the image of the surroundings of the vehicle when it is determined that the difference between the frequency of visits to the specific destination at the specific time and the frequency of visits to the specific destination at the time later than the specific time is detected,
determining that the difference between the frequency of visits to the specific destination at the specific time and the frequency of visits to the specific destination at the time later than the specific time is not detected, the frequency of visits to the specific destination at the specific time being a frequency at which the vehicle has travelled to the specific destination that is the destination that is arrived at after the vehicle has travelled thereto,
not acquiring the image of the surroundings of the vehicle when it is determined that the difference between the frequency of visits to the specific destination at the specific time and the frequency of visits to the specific destination at the time later than the specific time is not detected,
determining that the difference between the moving route to the specific destination at the specific time and the moving route to the specific destination at the time later than the specific time is detected, the moving route to the specific destination at the specific time being a moving route to the specific destination that is a destination that is arrived at after the vehicle has travelled thereto,
acquiring the image of the surroundings of the vehicle when it is determined that the difference between the moving route to the specific destination at the specific time and the moving route to the specific destination at the time later than the specific time is detected,
determining that the difference between the moving route to the specific destination at the specific time and the moving route to the specific destination at the time later than the specific time is not detected, the moving route to the specific destination at the specific time being the moving route to the specific destination that is the destination that is arrived at after the vehicle has travelled thereto, and
not acquiring the image of the surroundings of the vehicle when it is determined that the difference between the moving route to the specific destination at the specific time and the moving route to the specific destination at the time later than the specific time is not detected.

8. The non-transitory storage medium according to claim 7, wherein the behavior information includes motion information of the user.

9. The non-transitory storage medium according to claim 8, wherein the motion information includes information about a motion showing an emotion of the user.

10. The non-transitory storage medium according to claim 7, wherein the functions further include acquiring a voice of the user via a voice input unit of the vehicle when the difference is detected.

11. An information processing method executed by an information processing apparatus communicable with a vehicle, the information processing method comprising:
storing behavior information of a user in the vehicle in association with a date and time;

acquiring an image of surroundings of the vehicle via an imaging unit of the vehicle when a difference between behavior information at a specific time and behavior information at a time later than the specific time is detected; and storing the image in association with the date and time and the behavior information, wherein the behavior information includes driving information of the vehicle, the driving information includes a destination, a frequency of visits to a specific destination, and a moving route to a specific destination, and the method further comprises:

determining that the difference between the destination at the specific time and the destination at the time later than the specific time is detected, the destination at the specific time being a destination that is arrived at after the vehicle has travelled thereto, acquiring the image of the surroundings of the vehicle when it is determined that the difference between the destination at the specific time and the destination at the time later than the specific time is detected, determining that the difference between the destination at the specific time and the destination at the time later than the specific time is not detected, the destination at the specific time being the destination that is arrived at after the vehicle has travelled thereto, not acquiring the image of the surroundings of the vehicle when it is determined that the difference between the destination at the specific time and the destination at the time later than the specific time is not detected, determining that the difference between the frequency of visits to the specific destination at the specific time and the frequency of visits to the specific destination at the time later than the specific time is detected, the frequency of visits to the specific destination at the specific time being a frequency at which the vehicle has travelled to the specific destination that is a destination that is arrived at after the vehicle has travelled thereto, acquiring the image of the surroundings of the vehicle when it is determined that the difference between the frequency of visits to the specific destination at the specific time and the frequency of visits to the specific destination at the time later than the specific time is detected, determining that the difference between the frequency of visits to the specific destination at the specific time and the frequency of visits to the specific destination at the time later than the specific time is not detected, the frequency of visits to the specific destination at the specific time being a frequency at which the vehicle has travelled to the specific destination that is the destination that is arrived at after the vehicle has travelled thereto, not acquiring the image of the surroundings of the vehicle when it is determined that the difference between the frequency of visits to the specific destination at the specific time and the frequency of visits to the specific destination at the time later than the specific time is not detected, determining that the difference between the moving route to the specific destination at the specific time and the moving route to the specific destination at the time later than the specific time is detected, the moving route to the specific destination at the specific time being a moving route to the specific destination that is a destination that is arrived at after the vehicle has travelled thereto, acquiring the image of the surroundings of the vehicle when it is determined that the difference between the moving route to the specific destination at the specific time and the moving route to the specific destination at the time later than the specific time is detected, determining that the difference between the moving route to the specific destination at the specific time and the moving route to the specific destination at the time later than the specific time is not detected, the moving route to the specific destination at the specific time being the moving route to the specific destination that is the destination that is arrived at after the vehicle has travelled thereto, and not acquiring the image of the surroundings of the vehicle when it is determined that the difference between the moving route to the specific destination at the specific time and the moving route to the specific destination at the time later than the specific time is not detected.

12. The information processing method according to claim 11, wherein the behavior information includes motion information of the user.

13. The information processing method according to claim 12, wherein the motion information includes information about a motion showing an emotion of the user.

14. The information processing method according to claim 11, further comprising acquiring a voice of the user via a voice input unit of the vehicle when the difference is detected.

\* \* \* \* \*